United States Patent
Marks et al.

(10) Patent No.: US 8,188,921 B2
(45) Date of Patent: May 29, 2012

(54) APPARATUS AND METHOD FOR CONSTRUCTING AND UTILIZING A BEACON LOCATION DATABASE

(75) Inventors: David Allen Marks, Orinda, CA (US); Alexander James Serriere, Concord, CA (US)

(73) Assignee: Teecom Design Group, Oakland, CA (US)

( * ) Notice: Subject to any disclaimer, the term of this patent is extended or adjusted under 35 U.S.C. 154(b) by 307 days.

(21) Appl. No.: 12/562,875

(22) Filed: Sep. 18, 2009

(65) Prior Publication Data

US 2011/0068981 A1    Mar. 24, 2011

(51) Int. Cl.
    *G01S 3/02* (2006.01)
(52) U.S. Cl. ..................................................... 342/451
(58) Field of Classification Search ............... 455/456.1; 342/451, 458, 463–465
    See application file for complete search history.

(56) References Cited

U.S. PATENT DOCUMENTS

| | | | |
|---|---|---|---|
| 6,320,496 B1 | 11/2001 | Sokoler | |
| 7,433,694 B2 | 10/2008 | Morgan et al. | |
| 7,693,654 B1 * | 4/2010 | Dietsch et al. | 701/207 |
| 7,991,382 B1 * | 8/2011 | Gunasekara | 455/456.1 |
| 2003/0043073 A1 | 3/2003 | Gray et al. | |
| 2003/0085841 A1 * | 5/2003 | Spilker et al. | 342/464 |
| 2003/0115098 A1 * | 6/2003 | Kang | 705/14 |
| 2005/0135292 A1 | 6/2005 | Graumann | |
| 2006/0125693 A1 * | 6/2006 | Recker | 342/458 |
| 2007/0210961 A1 | 9/2007 | Romijn | |
| 2007/0270164 A1 * | 11/2007 | Maier et al. | 455/456.2 |
| 2009/0280835 A1 * | 11/2009 | Males et al. | 455/456.5 |
| 2010/0121488 A1 * | 5/2010 | Lee et al. | 700/245 |
| 2010/0315286 A1 * | 12/2010 | Cerniar | 342/357.25 |

OTHER PUBLICATIONS

Teecom Design Group. PCT US2010/049125, International Search Report and Written Opinion (Nov. 2, 2010).

* cited by examiner

*Primary Examiner* — Thomas Tarcza
*Assistant Examiner* — Fred H Mull
(74) *Attorney, Agent, or Firm* — Cooley LLP

(57) ABSTRACT

A method to support client device position discovery within a building includes ascribing building position coordinates to beacons within the building. The building position coordinates are converted to physical position coordinates. The physical position coordinates are augmented with at least one additional parameter that supports position resolution. A client device communicates with accessed beacons positioned within the building. A beacon location database characterizing the physical locations of the accessed beacons is also accessed. The physical location of the client device is computed based upon the physical locations of the accessed beacons.

11 Claims, 4 Drawing Sheets

APPARATUS AND METHOD FOR CONSTRUCTING AND UTILIZING A BEACON LOCATION DATABASE

FIELD OF THE INVENTION

This invention relates generally to locating the position of a wireless electronic device. More particularly, this invention relates to a technique for constructing and utilizing a beacon location database for client device position discovery within a building.

BACKGROUND OF THE INVENTION

Rapidly increasing interest in location-based services has increased the demand for ever-more precise positioning systems. The Global Positioning System (GPS) has become a de facto standard for determining the position of people and objects anywhere on the planet. However, GPS has one major limitation: the weak signals do not propagate into buildings. Consequently, it would be desirable to develop techniques that allow for device position discovery within a building.

SUMMARY OF THE INVENTION

A method to support client device position discovery within a building includes ascribing building position coordinates to beacons within the building. The building position coordinates are converted to physical position coordinates. The physical position coordinates are augmented with at least one additional parameter that supports position resolution. A client device communicates with accessed beacons positioned within the building. A beacon location database characterizing the physical locations of the accessed beacons is also accessed. The physical location of the client device is computed based upon the physical locations of the accessed beacons.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
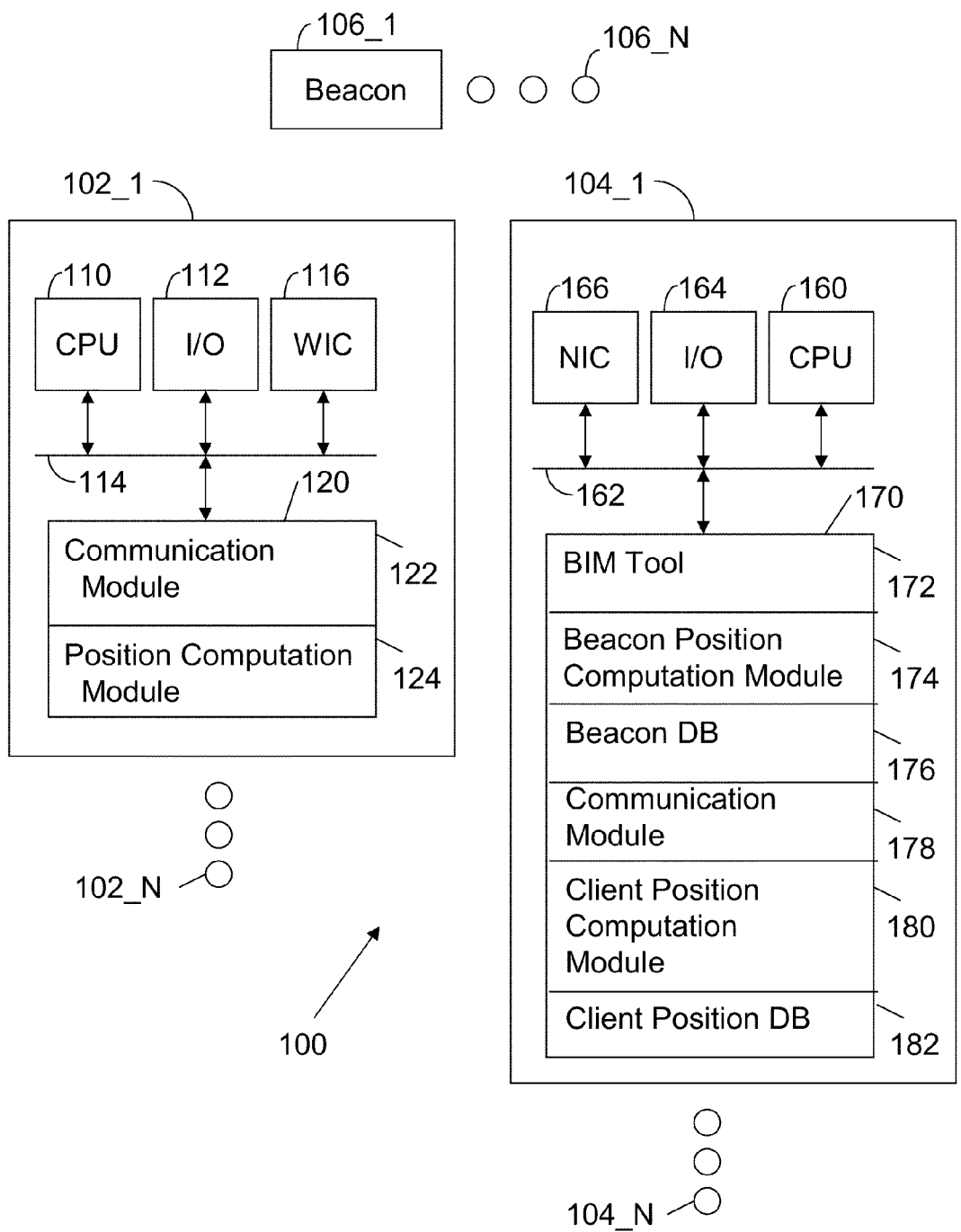
FIG. 1 illustrates a system configured in accordance with an embodiment of the invention.

FIG. 1 illustrates a system 100 configured in accordance with an embodiment of the invention. The system 100 includes at least one wireless client device 102 (illustrated as client devices 102_1 through 102_N) and at least one server 104 (illustrated as servers 104_1 through 104_N), which communicate in accordance with a wireless protocol. The system also includes a set of beacons 106_1 through 106_N, which support wireless communication in accordance with a wireless protocol. Each beacon is a transmitter that transmits continuous or periodic radio signals at a specified radio frequency. For example, in the field of Wi-Fi (wireless local area networks using the IEEE 802.11a/b/g/n specification), the term beacon references a specific data transmission from a wireless access point, which carries a service set identification (SSID), the channel number and security protocols. The transmission does not contain the link layer address of another Wi-Fi device so it can be received by any client.

Each client device 102 includes standard components, such as a central processing unit 110, which communicates with input/output devices 112 via a bus 114. The input/output devices 112 may include a keyboard and a display. A wireless interface circuit 116 is also connected to bus 114 to support wireless communications. A memory 120 is also connected to bus 114. The memory 120 includes executable instructions to support operations associated with the invention. For example, the memory 120 stores a communication module 122 to support wireless communication operations. The memory 120 also stores a position computation module 124, which performs operations that allow the client device to discover its position within a building.

The server 104 also includes standard components, such as a central processing unit 160 connected to input/output devices 164 via bus 162. A network interface circuit 166 is also connected to the bus 162. The network interface circuit 166 supports networked communications with either a wired or wireless device. The server 104 also includes a memory 170 connected to bus 162. The memory 170 stores executable instructions to implement operations of the invention. In one embodiment, the memory 170 stores a Building Information Modeling (BIM) tool. A BIM tool generates and manages building data. Typically, a BIM tool uses three-dimensional, real-time, dynamic building modeling software to increase productivity in building design and construction. The BIM tool characterizes building geometry, spatial relationships, geographic information, and quantities and properties of building components. In accordance with the invention, a BIM tool is supplemented to include beacon location information. In one embodiment, a beacon position computation module 174 supplements a BIM tool. The beacon position computation module 174 includes executable instructions to compute the physical location of beacons positioned within a building. In other words, a beacon's building position coordinates are extracted from construction documents or models associated with the BIM tool. Those coordinates are then transformed by the beacon position computation module to physical position coordinates (e.g., global positioning coordinates). This results in a beacon database 176 characterizing beacon position. The beacon database 176 may also include additional information to support client position resolution, as discussed below.

The memory 170 also stores a communication module 178 that supports communications with a wireless client 102. In one embodiment, the memory 170 also stores a client position computation module 180, which is used to compute the location of a client device within a building. The client position computation module 180 relies upon beacon information supplied by a client device. The client position computation module 180 may utilize more sophisticated positioning computations than are available on the client device. The client position may then be passed back to the client device. In addition, the client position computation module 180 may be used to populate a client position database 182. This database tracks the position of client devices within a building.

Figure 2:
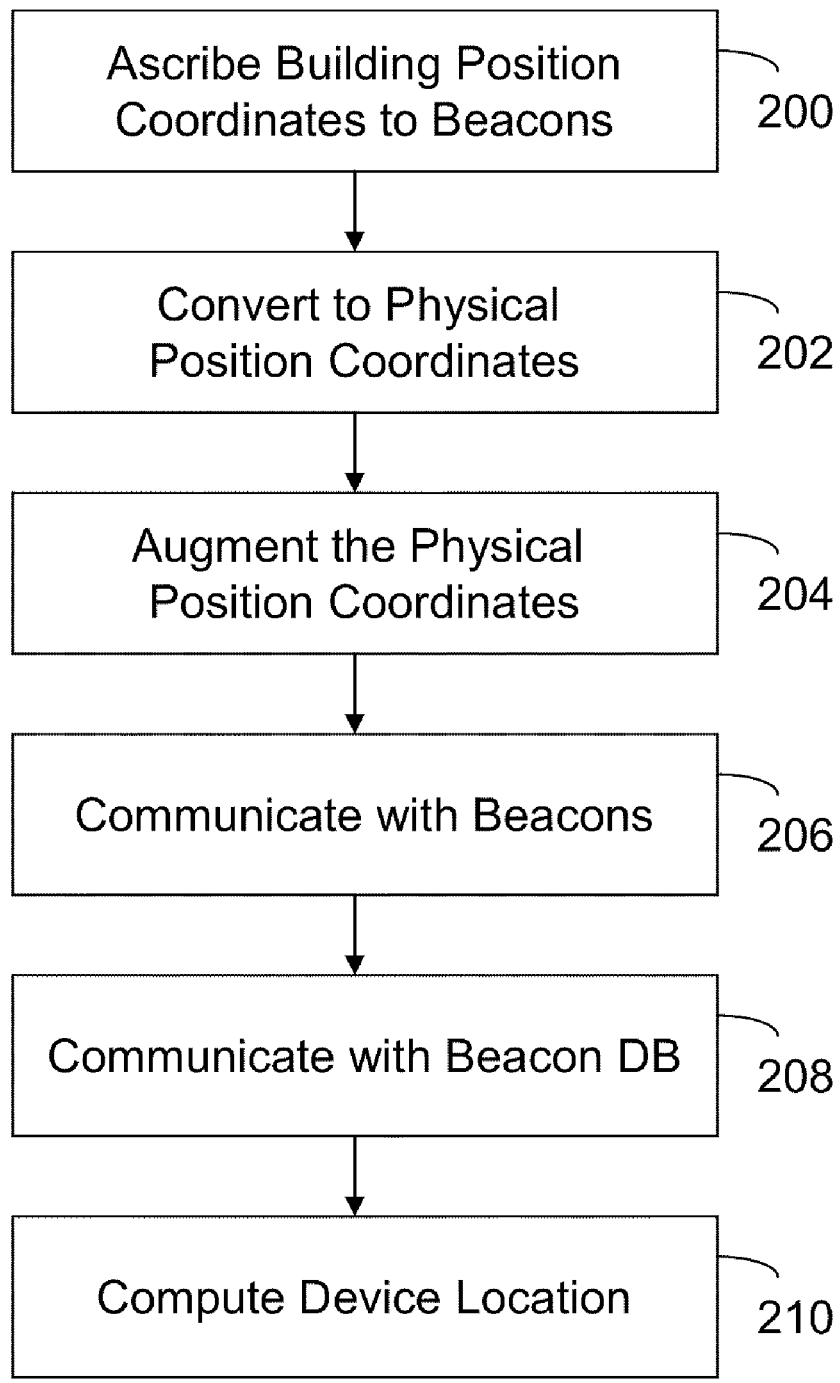
FIG. 2 illustrates processing operations associated with an embodiment of the invention.

FIG. 2 illustrates processing operations associated with an embodiment of the invention. Initially, building position coordinates are ascribed to beacons 200. Preferably, the BIM tool 172 is used to supply building position coordinates for the beacons. Alternately, a separate database may be constructed to store this information. The building position coordinates are then converted to physical position coordinates

202. Any number of conversion techniques may be used. In one embodiment of the invention, polar coordinates are normalized to a true north orientation. The conversion may also include ascribing Global Positioning System (GPS) coordinates to each beacon. The physical position coordinates are preferably augmented with at least one additional parameter that supports position resolution 204, as discussed below.

A client device 102 then communications with beacons 206. For example, the client device 102_1 of FIG. 1 may communicate with beacons 106_1 through 106_N, which are positioned within a building. The beacon database is also accessed 208. A version of the beacon database 176 may be in the client device. Alternately, relevant information from the beacon database 176 may be passed from the server 104_1 to the client device 102_1, as needed. Device location is then computed 210. Typically, the client device 102_1 will compute its position using the position computation module 124. In particular, the position computation module 124 relies upon the physical location of adjacent beacons to compute its location. Alternately, the client may pass information on adjacent beacons to the server 104, which computes the location of the client device and then passes the location information to the client device. The advantage of this approach is that it leverages the computational power of the server. Thus, more complex or dynamic position computations may be used to determine location. For example, the computations may take into account the construction materials in the building or use an advanced wireless heat map stored within the building information model. The server 104 may maintain a client position database 182 as it computes client locations. Alternately, the client position database 182 may be maintained by having each client device periodically report its position. The client position database 182 supports location based services. Thus, for example, a client device in a mall may receive information about a sale at a store in the mall.

The operations of the invention are more fully appreciated with reference to a specific example. The position of wireless beacons within a building are specified with a BIM tool. A typical BIM tool allows a user to attach computable information to the surfaces, edges and volumes that represent a building and the objects contained within the building.

Figure 3:
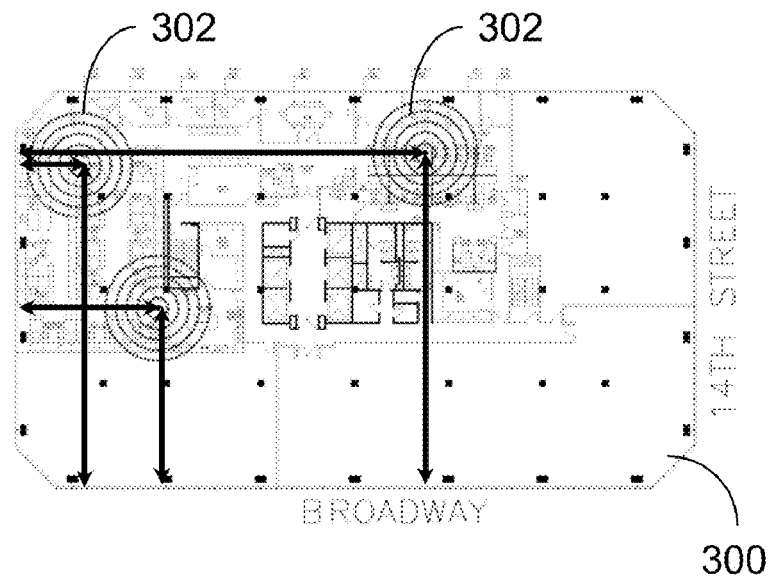
FIG. 3 illustrates beacon location information associated with a floor plan of a building.

FIG. 3 illustrates a floor plan 300 defined by a BIM tool. Drag and drop tools allow one to position beacons 302 on the floor plan 300. As a result, building position coordinates are automatically assigned to the beacons. Consider the following example with three beacons (AP1, AP2 and AP3) and associated coordinates.

| Beacon | X-Coordinate | Y-Coordinate | Z-Coordinate |
|--------|--------------|--------------|--------------|
| AP1 | 6.86573624 | 93.3055607 | 70 |
| AP2 | 29.2206297 | 52.2223299 | 70 |
| AP3 | 106.001336 | 96.7549541 | 70 |

Figure 4:
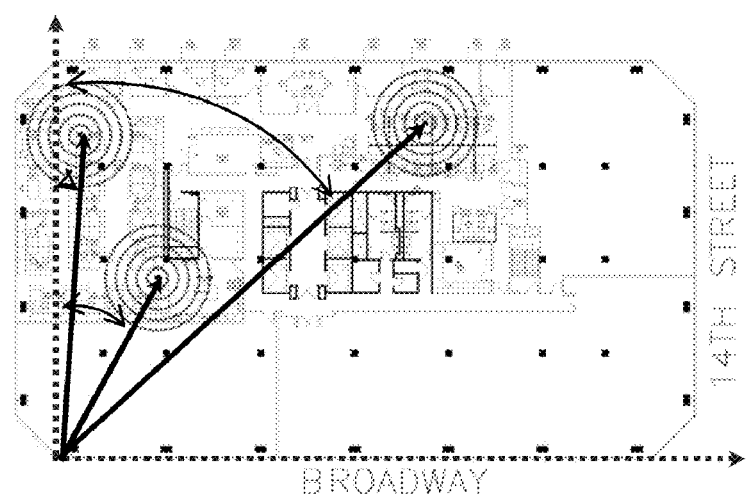
FIG. 4 illustrates the normalization of beacon location information in accordance with an embodiment of the invention.

The building position coordinates are then converted to physical position coordinates. In one embodiment, conversion is facilitated by using polar vectors. As shown in FIG. 4, beacon position is defined by the distance from the origin and the angle from vertical. This results in the following information.

| Beacon | Magnitude (ft.) = $\sqrt{X^2 + Y^2}$ | Bearing (°) = $90 - \operatorname{atan2}(y/X)/\Pi * 180$ |
|--------|--------------|---------|
| AP1 | 93.55782162 | 4.208431115 |
| AP2 | 59.84159874 | 29.22888144 |
| AP3 | 143.5193519 | 47.61107494 |

Figure 5:
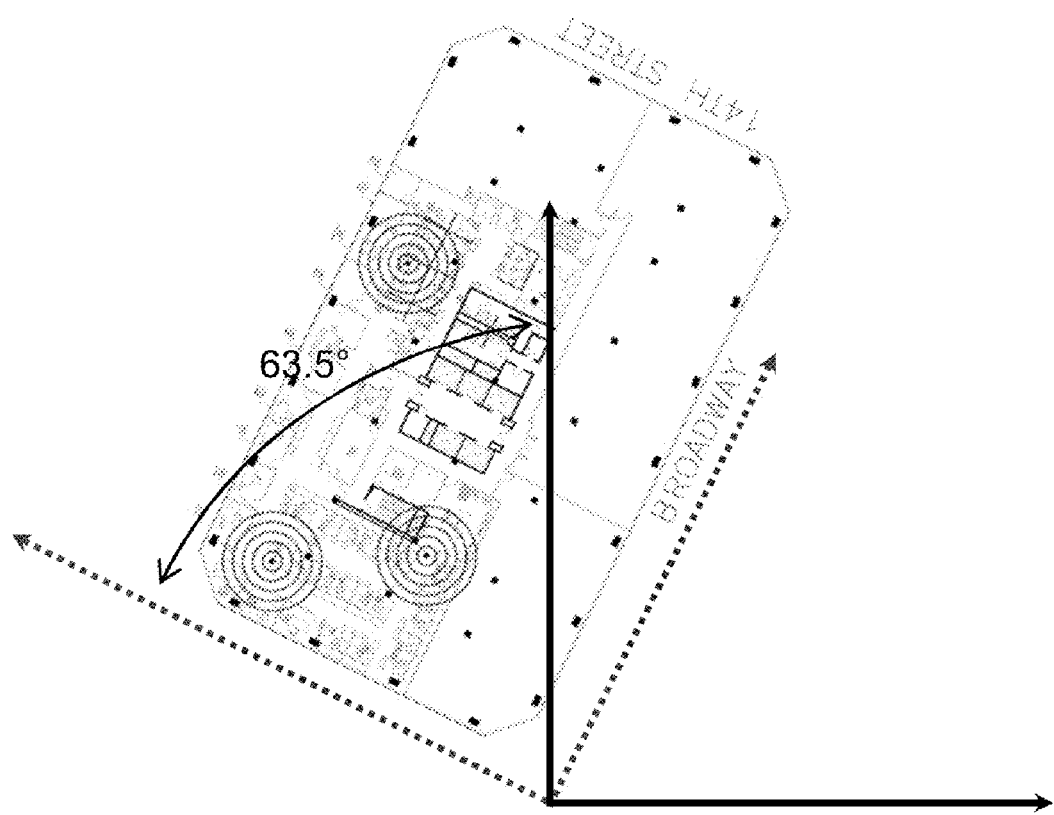
FIG. 5 illustrates the normalization of beacon location information in accordance with true north orientation in accordance with an embodiment of the invention.

The physical orientation is then determined with respect to a true north orientation, as shown in FIG. 5. A reference Global Positioning System (GPS) coordinate for the site is then used as the origin (0,0). In this example, the GPS coordinate is (37.8038630, -122.2718963). Using the calculated difference between true north and project north, the bearing angles are adjusted so that they are oriented to true north. In this example, an angle adjustment of 63.5° is required. This results in the following updated data.

| Beacon | Magnitude (ft.) | Bearing (°) = $360 - 63.5 + \Theta$ |
|--------|-----------------|---------|
| AP1 | 93.55782162 | 300.7153755 |
| AP2 | 59.84159874 | 325.7358258 |
| AP3 | 143.5193519 | 344.1180193 |

The GPS coordinates of the beacons are now computed from the polar vectors and the reference coordinate ($lat_1$, $lon_1$). This results in the following data.

| Beacon R(radius of earth = 20,902,231 ft) d = magnitude Θ = bearing | Latitude = $\operatorname{asin}(\sin(lat_1) * \cos(d/R) + \cos(lat_1) * \sin(d/R) * \cos(\Theta))$ | Longitude = $lon_1 + \operatorname{atan2}(\sin(\Theta) * \sin(d/R) * \cos(lat_1), \cos(d/R) - \sin(lat_1) * \sin(lat_2))$ |
|---|---|---|
| AP1 | 37.803994 | -122.2721753 |
| AP2 | 37.80399857 | -122.2720132 |
| AP3 | 37.80424139 | -122.2720326 |

Each beacon has a unique identifier. For example, in the case of a Wi-Fi access point, the unique identifier is its MAC address. The unique identifier is added to the beacon database 176. This may result in the following table.

| Beacon | MAC Address | Coordinates (Latitude, Longitude, Altitude) |
|--------|-------------|---------|
| AP1 | 00:13:B0:05:18:F0 | (37.803994, -122.2721753, 70) |
| AP2 | 00:1C:50:05:1C:70 | (37.80399857, -122.2720132, 70) |
| AP3 | 00:1C:B0:05:61:C0 | (37.80424139, -122.2720326, 70) |

A client device within range of a beacon can query the database and retrieve the precise coordinates of the beacon. This information, coupled with signal strength allows the device to calculate its distance to the GPS coordinates. With information from at least two other beacons, the device can calculate its position. For example, a sensing radio in a client device detects and measures signals from nearby beacons. In the case of Wi-Fi access points, the MAC address of the beacon's radio is used to uniquely identify the detected radio signals since this information is automatically broadcast as part of the Wi-Fi specification. Other types of location beacons may broadcast on unique frequencies or broadcast other information unique to that beacon.

Once the signals have been uniquely identified and the strength of those signals has been measured, the position of the location beacon from which the signal originates is retrieved from the beacon database 176. In one embodiment, the beacon database 176 is a text file on the client device with each line of the file composed of the beacon's identifier, its latitude, its longitude, and its altitude. A positioning program can then search the text file for the unique identifier and retrieve the GPS coordinates of the beacon. Alternatively, the database can be accessed via the internet and the client device can connect to it remotely to retrieve the information.

With the measured signal strengths and the GPS coordinates of at least three location beacons, the client device can calculate its own position. First, the distance to each beacon is estimated. This can be achieved in any number of way. One approach is to use the free space path loss equation:

$$FSPL(\text{dB}) = 20 \log_{10}(d) + 20 \log_{10}(f) + 92.44$$

where d is the distance in meters f is the frequency of the signal in megahertz and the loss (FSPL) is the ratio of the beacon's power output to the received power. This does not take into account the antenna gains in the transmitter or receiver, nor does it account for additional losses due to obstructions. A more accurate method is to use a link budget calculation. A link budget is the accounting of all of the gains and losses from a transmitter through a medium to a receiver in a telecommunication system. The link budget accounts for the attenuation of the transmitted signal due to propagation, antenna gains, and miscellaneous losses. A simple link budget equation is:

Received Power(dBm) = Transmitted Power(dBm) + Gains(dB) − Losses(dB)

A still more accurate method is to rely upon a laboratory test to determine the correct equation for distance as a function of signal strength for every type of beacon. Finally, with the approximate distance to each beacon, the device can calculate its position using trilateration. Trilateration is a method for determining the intersection of three sphere surfaces given the centers and radii of the three spheres. A mathematical derivation for the solution of a three-dimensional trilateration problem can be found by taking the formulae for three spheres and setting them equal to one another.

The beacon database 176 may be supplemented to include additional parameters to support position resolution. This information may include a beacon manufacturer, a beacon model number, a beacon antenna design parameter, and a beacon power output parameter. The following table illustrates a beacon database with augmented information.

| MAC Address | Coordinates | Manufacturer | Model Number | Antenna Design | Power Output |
|---|---|---|---|---|---|
| 00:1C:B0:05:18:F0 | (37.803994, −122.2721753, 70) | Cisco | Aironet 1250 | Directional Patch | 200 mW |
| 00:1C:B0:05:1C:70 | (37.80399857, −122.2720132, 70) | Aruba | AP-120 | Omnidirectional Multi-band Dipole | 175 mW |
| 00:1C:B0:05:61:C0 | (37.80424139, −122.2720326, 70) | Meru | RS4000 | Directional Yagi | 110 mW |

The foregoing table may include other information, such as an experimentally determined distance function. For example, each row may include a column defining a Received Power (dBm) = $f_x(d)$.

Various techniques may be used to exploit this information. For example, if the antenna design for a specific beacon is highly directional rather than omni-directional, this information can be accounted for in a more accurate position computation.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using a general programming language, JAVA®, C++, or another object-oriented or non-object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
    accessing a building information modeling tool that provides a three-dimensional model of a building;
    ascribing building position coordinates to beacons within the building, wherein the building position coordinates express spatial relationships in the three-dimensional model of the building;
    converting the building position coordinates to physical position coordinates;
    augmenting the physical position coordinates with at least one additional parameter that supports position resolution; and
    adding the physical position coordinates and at least one additional parameter to a database.

2. The method of claim 1 wherein converting includes utilizing polar vectors.

3. The method of claim 1 wherein the physical position coordinates are expressed as latitude, longitude and altitude.

4. The method of claim 1 wherein the at least one additional parameter is selected from a beacon manufacturer, a beacon model number, a beacon antenna design parameter, a beacon radio frequency and a beacon power output parameter.

5. The method of claim 1 further comprising delivering the physical position coordinates and at least one additional parameter to a client device within the building.

6. The method of claim 1 further comprising computing at a server a client device position within the building.

7. The method of claim 6 further comprising storing client device location information at the server.

8. A computer readable storage medium, comprising executable instructions to:
    access a building information modeling tool that provides a three-dimensional model of a building;
    ascribe building position coordinates to beacons within a building, wherein the building position coordinates express spatial relationships in the three-dimensional model of the building;
    convert the building position coordinates to physical position coordinates;
    augment the physical position coordinates with at least one additional parameter that supports position resolution; and
    deliver the physical position coordinates and at least one additional parameter to a client device within the building.

9. The computer readable storage medium of claim 8 wherein the at least one additional parameter is selected from a beacon manufacturer, a beacon model number, a beacon antenna design parameter, beacon radio frequency and a beacon power output parameter.

10. The computer readable storage medium of claim 8 wherein the executable instructions to convert include executable instructions to utilize polar vectors.

11. The computer readable storage medium of claim 10 wherein the physical position coordinates are expressed as latitude, longitude and altitude.

* * * * *